United States Patent [19]
Hepburn et al.

[11] Patent Number: 5,772,972
[45] Date of Patent: Jun. 30, 1998

[54] CATALYST/HYDROCARBON TRAP HYBRID SYSTEM

[75] Inventors: Jeffrey Scott Hepburn, Dearborn; Hung-Wen Jen, Troy; Harendra Sakarlal Gandhi, Farmington Hills; Klaus Otto, Livonia, all of Mich.

[73] Assignee: Ford Global Technologies, Inc., Dearborn, Mich.

[21] Appl. No.: 715,254

[22] Filed: Sep. 16, 1996

Related U.S. Application Data

[63] Continuation of Ser. No. 370,284, Jan. 9, 1995, abandoned.

[51] Int. Cl.$^6$ ............................... F01N 3/10; B01D 53/34
[52] U.S. Cl. ......................... 423/213.5; 423/213.2; 422/171; 422/177; 422/180; 422/211; 422/222
[58] Field of Search .................... 422/169–171, 422/173–174, 180, 177, 211, 179, 221, 222; 60/299, 301, 297, 274; 502/439, 527, 213, 303, 333; 423/212 R, 213.2, 213.5, 213.7, 212 C

[56] References Cited

U.S. PATENT DOCUMENTS

| | | | |
|---|---|---|---|
| 4,631,262 | 12/1986 | Lachman et al. | 502/439 |
| 4,985,210 | 1/1991 | Minami | 422/169 |
| 5,112,790 | 5/1992 | Watanabe et al. | 502/213 |
| 5,116,800 | 5/1992 | Williamson et al. | 502/303 |
| 5,125,231 | 6/1992 | Patil et al. | 422/171 |
| 5,140,811 | 8/1992 | Minami et al. | 60/297 |
| 5,142,864 | 9/1992 | Dunne | 60/274 |
| 5,184,462 | 2/1993 | Schatz | 60/274 |
| 5,207,734 | 5/1993 | Day et al. | 60/278 |
| 5,269,140 | 12/1993 | Take et al. | 60/274 |
| 5,271,906 | 12/1993 | Yuuki et al. | 422/177 |
| 5,284,638 | 2/1994 | Hertl et al. | 423/245.1 |
| 5,296,198 | 3/1994 | Abe et al. | 422/177 |
| 5,303,547 | 4/1994 | Mieville et al. | 422/173 |
| 5,330,945 | 7/1994 | Beckmeyer et al. | 502/66 |

*Primary Examiner*—Hien Tran
*Attorney, Agent, or Firm*—Lorraine S. Melotik

[57] ABSTRACT

The invention is an automotive catalyst system for treating internal combustion engine exhaust gases. The system comprises a hybrid system of hydrocarbon trapping material and palladium based three-way catalyst material, the hydrocarbon trapping material being capable of adsorbing hydrocarbons present in said internal combustion exhaust gases and substantially maintaining adsorbance of the adsorbed hydrocarbons until after the palladium based three-way catalyst material reaches a temperature at which it is capable of oxidizing the hydrocarbons. The palladium based three-way catalyst is carried on a substrate, which may be the trapping material, in an amount of between about 100–500 g palladium/ft$^3$ of substrate.

6 Claims, 2 Drawing Sheets

Catalyst material

HC adsorbent material

Conventional substrate

Conventional substrate

Zeolitic substrate

11# CATALYST/HYDROCARBON TRAP HYBRID SYSTEM

This is a continuation of application Ser. No. 08/370,284 filed Jan. 9, 1995, now abandoned.

FIELD OF THE INVENTION

The invention is directed to a hybrid system for treating internal combustion engine exhaust gases. More particularly, the system comprises a substrate carrying a hybrid of hydrocarbon adsorbing material and a palladium based three-way catalyst with a high palladium metal loading.

BACKGROUND OF THE INVENTION

In order to meet proposed Federal emission regulations and California ULEV emission levels, means other than conventional exhaust treatment catalysts may be required to prevent the exit, to the atmosphere, of unburnt or partially burnt engine-out hydrocarbon (HC) emissions. These emissions can occur in abundance during cold starting of the engine before the normal exhaust treatment catalyst, e. g., a three-way catalyst is operational. They derive their name from their ability to simultaneously oxidize hydrocarbons and carbon monoxide while reducing nitrogen oxides present in internal engine exhaust gases. FIG. 1 shows carbon monoxide (CO) and HC conversion efficiency for a conventional three-way catalyst as a function of time during a simulated engine cold start.

It has been suggested that to reduce cold start HC emissions, the exhaust gas from the engine could be routed through a HC trap containing material like activated carbon which can adsorb the HCs, and then through the normal catalytic convertor. The objective is to remove HC from the exhaust gas during the period in which the catalytic convertor is not yet active, i.e., the catalyst has not reached its "light-off" temperature. Once the convertor has reached that temperature, the hydrocarbons would then be purged from the trap and reacted over the catalyst. In one scheme, a HC trap is located upstream of the catalytic convertor. Success with this approach has been limited because the HC trap acts as a heat sink delaying heating of the convertor to its light off temperature. In this case, hydrocarbons are released by the trap significantly before the convertor becomes active. In another configuration, the HC trap can be located downstream of the convertor. The major drawback associated with this approach is that it requires complicated valving of the exhaust and a purging mechanism. This second configuration is disclosed in U.S. Pat. No. 5,125,231 to Patil et al.

It would be desirable if a system could overcome the disadvantages associated with prior art systems. The present invention accomplishes this by forming a hybrid system incorporating hydrocarbon trapping materials and a highly loaded palladium on alumina catalyst.

DISCLOSURE OF THE INVENTION

The invention is an automotive catalyst system for treating internal combustion engine exhaust gases, the system comprises: a hybrid of hydrocarbon trapping material and a palladium based three-way catalyst material, the hydrocarbon trapping material being capable of adsorbing hydrocarbons present in internal combustion exhaust gases and substantially maintaining adsorbance of the hydrocarbons until after the three-way catalyst material reaches a temperature at which it is capable of oxidizing hydrocarbons, the three-way catalyst being carried on a substrate in an amount of between about 100–500 g palladium/ft$^3$ of substrate. Optionally, the substrate may be the hydrocarbon trapping material.

According to certain embodiments of the invention, the hybrid of the trapping material and the three-way catalyst may be a mixture thereof which may be provided on a substrate such as a monolithic ceramic substate, or in a layered arrangement with either being provided first on the substrate. Preferably, the hydrocarbon trapping material is provided first on a substrate with the catalyst being carried thereon. The substrate may be the hydrocarbon trapping material itself provided, e.g., as an extruded monolith.

DETAILED DESCRIPTION OF THE PREFERRED EMBODIMENTS

According to one aspect of the present invention, a substrate for the catalyst system is selected. The substrate may be, e. g., of the general type known, such as a monolithic ceramic substrate, e.g., cordierite, a monolithic metallic substrate, or pelletized catalytic substrates. As disclosed above, according to one embodiment the substrate may be a monolith formed of extruded hydrocarbon trapping material. In this system, the palladium based three-way catalyst would be carried on the extruded monolith formed of hydrocarbon trapping material. More generally, the system would comprise a substrate as those defined above, different from the hydrocarbon trapping material. In this latter embodiment, the other components of the system comprise a hydrocarbon trapping material and a three-way catalyst. As disclosed above, the hydrocarbon trapping material is capable of adsorbing hydrocarbons present in internal combustion exhaust gases and substantially maintaining absorbance of the hydrocarbons until after the palladium based three-way catalyst material reaches a temperature at which it can oxidize hydrocarbons. Exemplary of hydrocarbon trapping materials which may be used in this invention are various zeolite materials. Particularly preferred are H-ZSM5 or ion exchanged ZSM5 materials such as Cu-ZSM5 or Pt-ZSM5 which optimally have a Si/Al ratio ranging from 30:1 to 150:1 to maximize the adsorption selectivity of hydrocarbons relative water. Still other hydrocarbon trapping materials which may be used in the present invention system will be apparent to those skilled in the art in view of the present disclosure.

The second material of the aspect of the hybrid system of this invention disclosed above is a palladium three-way catalyst which is suitable to simultaneously convert the components of exhaust gases, such as those from an internal combustion engine like hydrocarbons, carbon monoxide, and nitrogen oxides into more desirable species like carbon dioxide, water, and nitrogen under near stoichiometric engine conditions. Such catalysts are well known to those skilled in the art. The palladium based three-way catalyst may be palladium or palladium with another noble metal like rhodium. It is carried optimally on a high surface area support material like alumina which often includes various promoters and stabilizers such as ceria, barium oxide, lanthanum oxide, or strontium. Still other TWCs which may be employed in this invention will be apparent in view of the present disclosure.

Figure 1:
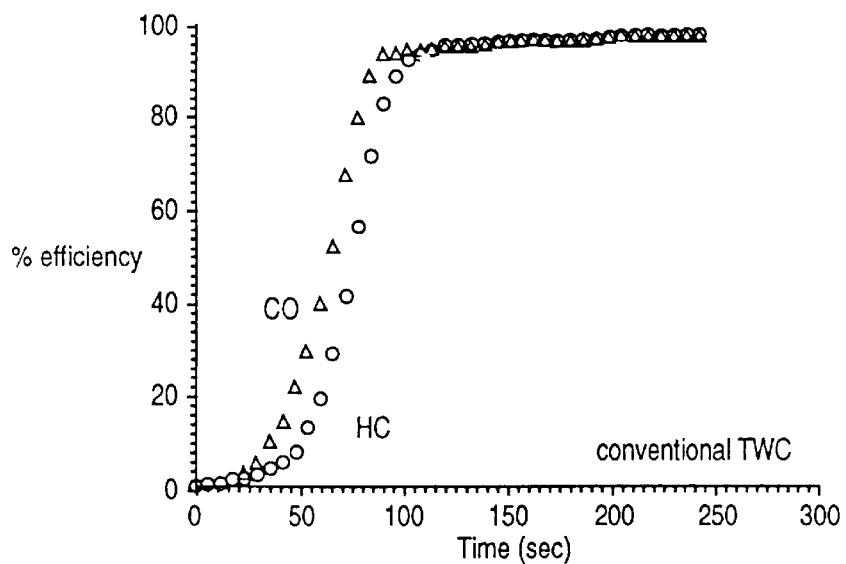
FIG. 1 is a graph illustrating CO and HC conversion efficiency as a function of time during a simulated engine cold start for a conventional catalyst.
Figure 2:
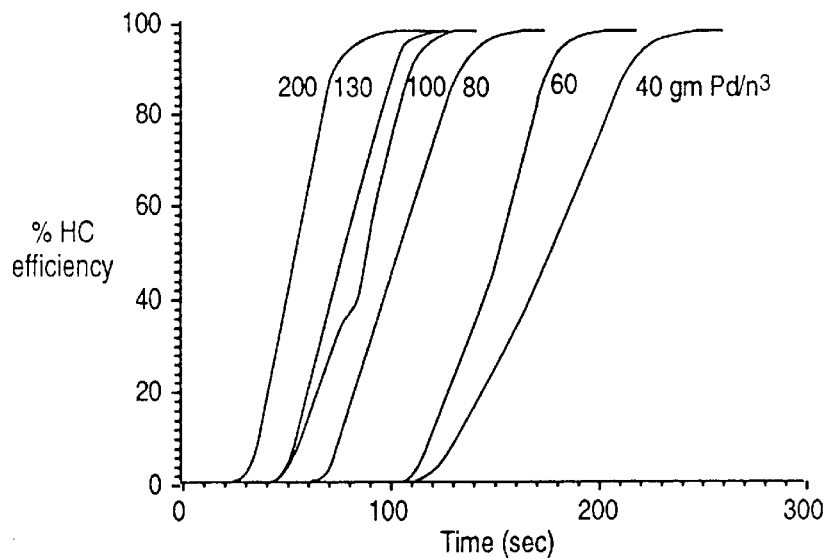
FIG. 2 is a graph showing HC efficiencies as a function of time during a simulated engine cold start for several Pd/Al$_2$O$_3$ catalysts having varying palladium loading.

As disclosed above, it is critical for the functioning of the present hybrid system, that the palladium based three-way catalyst in this invention is present in a relatively high loading on the substrate, i.e., in an amount of between about 100–500 g palladium/ft$^3$ of substrate. As discused above, depending on the embodiment prepared, the substrate may be a ceramic monolith like cordierite of a monolithic substrate formed from the hydrocarbon trapping material. FIG. 2 is a graph showing HC efficiencies as a function of time during a simulated engine cold start for several Pd/Al$_2$O$_3$ catalysts (palladium supported on alumina) having varying palladium loadings on the substrate. Our data shows that catalyst light-off taking place sooner (i.e., at a lower temperature) with increasing palladium loading. Highly loaded palladium on alumina is a preferred choice for the catalyst material because it can be made to light-off at relatively low temperatures (i.e., below the temperature at which hydrocarbons appreciably desorb from the trapping material).

Figure 3A:
FIGS. 3A, 3B and 3C are schematics of embodiments of the present invention hybrid catalyst-hydrocarbon trap as viewing one cell of such systems.
Figure 3A:
Figure 3A:
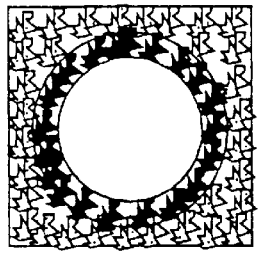
Figure 3B:
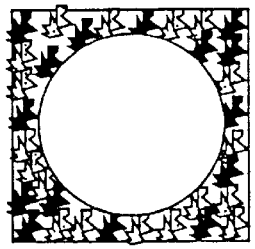
Figure 3C:
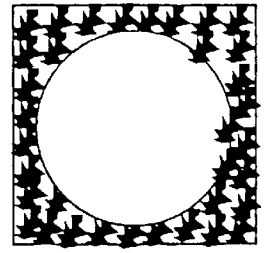

By employing a high loading of catalyst as described, we have found that the palladium based three-way catalyst becomes significantly more active for hydrocarbon oxidation at lower temperatures, thus providing the synergistic result that when the hydrocarbons are desorbed from the trapping material they are readily oxidized by the catalyst material. Thus hydrocarbon emissions associated with conventional exhaust systems during cold start are substantially reduced. The hybrid of the trapping material and the support material/catalyst may be a mixture thereof (as shown in FIG. 3B) which may be provided on the substrate detailed above, e.g., cordierite, or may comprise a layered arrangement with either the trapping material or catalyst being provided first on this type of substrate. In FIGS. 3A, 3B and 3C, a single cell of a monolith catalytic structure is shown in cross-section. Considering a hybrid mixture embodiment, powders of both the trapping materials and catalyst provided on, e.g., alumina, could be blended and then washcoated on the substrate. Preferably, however, the hydrocarbon trapping material is provided (washcoated) first on the substrate and then the catalyst/support material is washcoated thereon. This embodiment is shown in FIG. 3A. In this manner, hydrocarbon species which desorb from the inner layer of trapping material are made to pass through the outer layer containing the the active catalyst, e.g., palladium, and are readily oxidized to carbon dioxide and water.

The manner of applying such materials to the substrate would be readily apparent to those skilled in art of catalyst manufacture and the present disclosure. Preferably, the trap material would be washcoated on the substrate followed by a drying and calcination step and then the catalyst/support material would be washcoated directly on top of the previously deposited trap material followed by drying and calcination of the hybrid. While the preferred outcome of the preparation procedure is a system with an inner layer of trap material and an outermost layer of three-way catalyst material, the order of the trap material layer and three-way catalyst material layer could be reversed. That is, the hydrocarbon trapping material would constitute the outer layer.

One way to increase the performance effectiveness of the hybrid trapping material/catalyst material is to increase total hydrocarbon adsorption capacity by providing relatively larger amounts of hydrocarbon trapping material onto the substrate. Since there are practical limitations to the amount of hydrocarbon trapping material which can be loaded onto the substrate, another aspect of the present invention is disclosed. The substrate itself may be fabricated of a hydrocarbon trapping material such as zeolite. For example, an extruded monolith can be made of zeolite which serves as the trapping material of the hybrid system of the present invention. The palladium based three-way catalyst may then be provided on this monolith as by washcoating palladium/alumina thereon. This embodiment is shown in FIG. 3C.

EXAMPLES

A high silica zeolite (Si/Al=30) was obtained from a commercial source as H-ZSM5 and ion exchanged with a copper nitrate solution and then dried at 120° C. and calcined at 500° C. in order to produce Cu-ZSM5. A palladium on alumina catalyst material was prepared by impregnating gamma-alumina (100 m$^2$/g) with an aqueous solution containing palladium nitrate followed by drying at 120° C. and calcination at 500° C. The resulting material Cu-ZSM5 and Pd/Al$_2$O$_3$ were balled milled then mixed with distilled water to produce a slurry of each material. First, the slurry containing the zeolite material was applied to a corderite monolith (400 cells/in$^2$) to obtain a 15 wt % loading of the copper exchanged zeolite. The monolith was subsequently dried at 120° C. for 4 hours followed by calcination in air at 500° C. for four hours.

Figure 4:
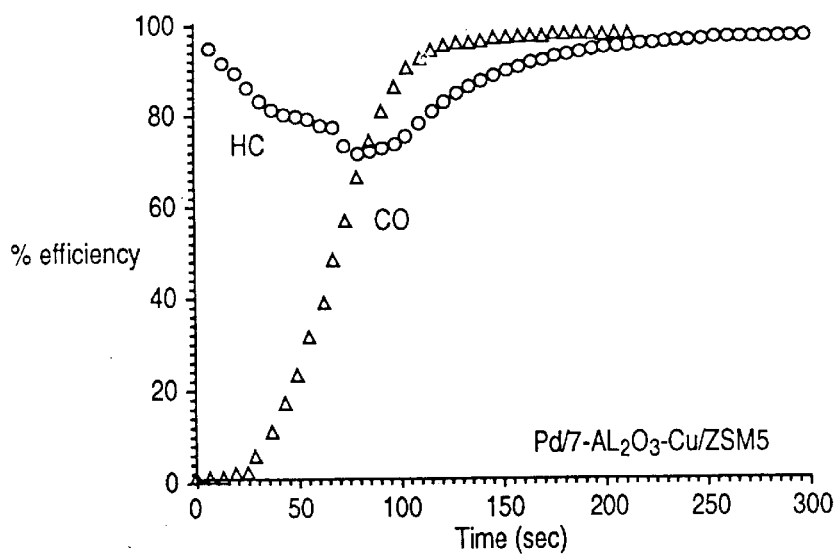
FIG. 4 is a graph illustrating CO and HC efficiency for a hybrid catalyst-hydrocarbon trap according to an embodiment of the present invention.

This preparation provided for a hybrid catalyst-hydrocarbon trap according to an embodiment of the present invention comprising an inner layer of hydrocarbon trapping material and an outer layer of catalytics material. The resulting catalyst-hydrocarbon trap was analyzed and found to contain a copper loading of 60 gm/ft$^3$ and a palladium loading of 200 gm/ft$^3$. FIG. 4 graphically shows catalyst CO and HC efficiency as a function of time during a simulated engine cold start for the catalyst-hydrocarbon trap made above. It can be seen that the catalyst material becomes active for hydrocarbon oxidation before hydrocarbons desorb from the trapping material.

Figure 5:
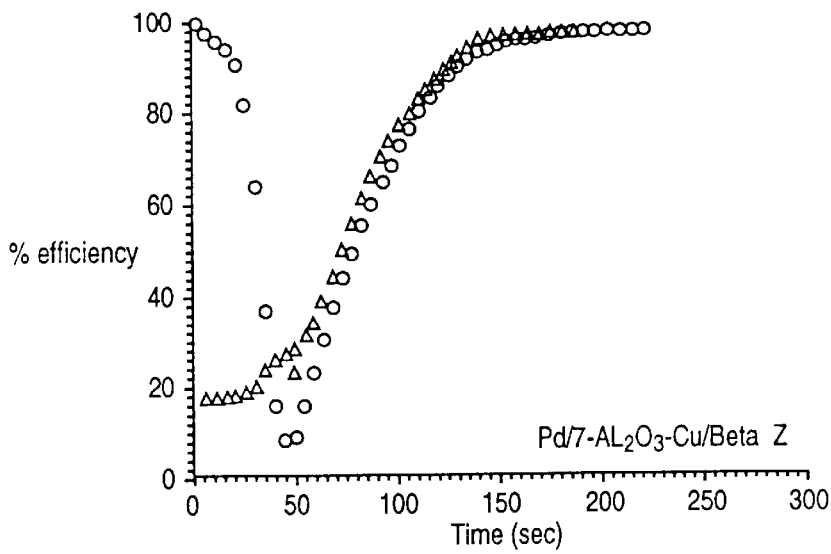
FIGS. 5 and 6 are graphs illustrating CO and HC efficiency for comparative hybrid catalyst-hydrocarbon traps not according to the present invention.

To illustrate the importance of the proper selection of both the hydrocarbon trap and catalytic materials, two hybrid catalyst-hydrocarbon traps, not according to the present invention were prepared for comparison, generally following the preparation procedures outlined above. The first comparative example catalyst-hydrocarbon trap comprised an inner washcoat layer of Cu-Beta zeolite (60 gm Cu/ft$^3$), not according to the present invention, and an outer washcoat layer of Pd/Al$_2$O$_3$ (200 gm Pd/ft$^3$). FIG. 5 shows CO and HC efficiency as a function of time during a simulated engine cold start for this first comparative example. In this case, the hydrocarbon trapping and catalyst materials were inappropriately selected; the hydrocarbon trapping material did not have sufficient hydrocarbon sorption capacity or sorption strength to hold the hydrocarbons until the catalytic material was activated.

Figure 6:
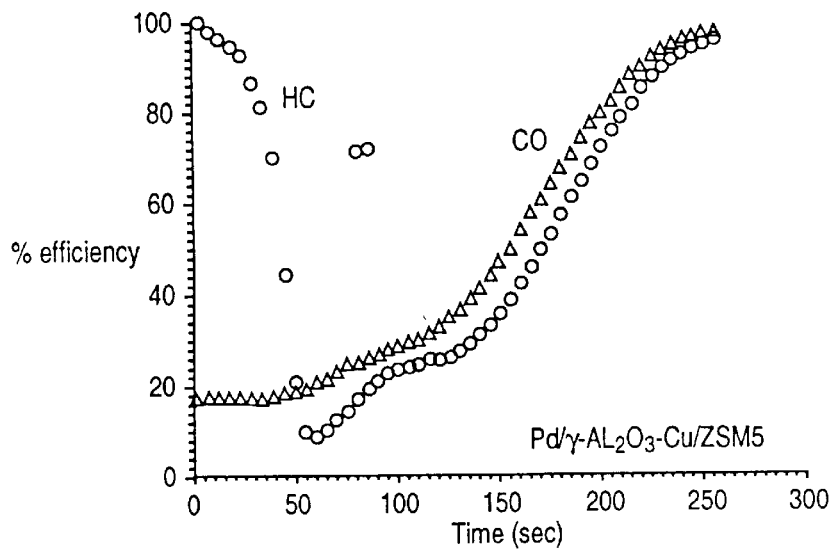

A second comparative example consisted of an inner washcoat layer of Cu-ZSM5 (60 gm Cu/ft$^3$) and an outer washcoat layer of Pd/Al$_2$O$_3$ (40 gm Pd/ft$^3$). FIG. 6 shows catalyst CO and HC efficiency as a function of time during a simulated engine cold start for this second comparative example. In this case, the hydrocarbon trapping and catalyst materials were also inappropriately selected; the light-off temperature for the catalyst material was too high because of too low a Pd loading. Therefore when hydrocarbons were released by the trapping material the catalyst was insufficiently active.

We claim:

1. A method for reducing cold start hydrocarbon emissions from a gasoline internal combustion engine for treating exhaust gases during cold start of said engine by the steps consisting of:

provide a hybrid system of hydrocarbon trapping material and palladium based three-way catalyst material supported on alumina or ceria in an exhaust gas system of a gasoline internal combustion engine, said hydrocarbon trapping material capable of adsorbing hydrocarbons present in said internal combustion engine exhaust gases and substantially maintaining adsorbance of said adsorbed hydrocarbons present in said internal combustion engine exhaust gases until after said palladium based three-way catalyst material reaches a temperature at which it is capable of oxidizing said hydrocarbons as they desorb from said hydrocarbons trapping material, said supported palladium based three-way catalyst material being carried on a substrate in an amount of about 130–500 g palladium/ft$^3$ of said substrate, wherein said substrate is selected from (a) said hydrocarbon trapping material and such that said supported palladium based three-way catalyst material is provided as a layer on said hydrocarbon trapping material, (b) monolithic ceramic material and such that said supported palladium based three-way catalyst material and said hydrocarbon trapping material are provided as a mixture thereof or as layers, one upon the other, on said monolithic ceramic material, and (c) monolithic metallic material and such that said supported palladium based three-way catalyst material and said hydrocarbon trapping material are provided as a mixture thereof or as layers, one upon the other, on said monolithic metallic material; and contacting said hybrid system with said exhaust gases.

2. A hydrocarbon trapping/catalyst system for reducing cold start hydrocarbon emissions from a gasoline internal combustion engine, the hydrocarbon trapping/catalyst system consisting of:

a hybrid system of hydrocarbon trapping material and palladium based three-way catalyst material supported on alumina or ceria, said hydrocarbon trapping material being capable of adsorbing hydrocarbons present in gasoline internal combustion engine exhaust gases during cold starting and substantially maintaining adsorbance of said adsorbed hydrocarbons until after said palladium based three-way catalyst material reaches a temperature at which said palladium based three-way catalyst material is capable of oxidizing said hydrocarbons as they desorb from said hydrocarbon trapping material, said supported palladium based three-way catalyst material being carried on a substrate in an amount of 130 to 500 g palladium/ft$^3$ of said substrate, wherein said substrate is selected from (a) said hydrocarbon trapping material and such that said supported palladium based three-way catalyst material is provided as a layer on said hydrocarbon trapping material, (b) monolithic ceramic material and such that said supported palladium based three-way catalyst material and said hydrocarbon trapping material are provided as a mixture thereof or as layer, one upon the other, on said monolithic ceramic material, and (c) monolithic metallic material and such that said supported palladium based three-way catalyst material and said hydrocarbon trapping material are provided as a mixture thereof or as layers, one upon the other, on said monolithic metallic material.

3. The system according to claim 2 wherein said hydrcarbon trapping material is provided first on said substrate, selected from monolithic ceramic material and said monolithic metallic material, and said catalyst is carried thereon.

4. The system according to claim 2 wherein said trapping material is selected from zeolite materials.

5. The according to claim 4 wherein said zeolite materials are selected from ZSM5 or ion exchanged ZSM5 materials.

6. The system according to claim 2 wherein said substrate in section (a) is an extruded zeolite.

* * * * *